US012463445B2

(12) United States Patent
Zou et al.

(10) Patent No.: US 12,463,445 B2
(45) Date of Patent: Nov. 4, 2025

(54) HYBRID OPTIMIZED CONTROL FOR DC-DC CONVERTER

(71) Applicant: Rivian IP Holdings, LLC, Irvine, CA (US)

(72) Inventors: Shenli Zou, Redondo Beach, CA (US); Maziar Mobarrez, Irvine, CA (US); Steven Schulz, Torrance, CA (US); Zahra Mohajerani, Los Angeles, CA (US)

(73) Assignee: Rivian IP Holdings, LLC, Irvine, CA (US)

( * ) Notice: Subject to any disclaimer, the term of this patent is extended or adjusted under 35 U.S.C. 154(b) by 811 days.

(21) Appl. No.: 17/709,593

(22) Filed: Mar. 31, 2022

(65) Prior Publication Data

US 2023/0066489 A1 Mar. 2, 2023

Related U.S. Application Data

(60) Provisional application No. 63/239,962, filed on Sep. 2, 2021.

(51) Int. Cl.
*H02J 7/00* (2006.01)
*H02M 3/335* (2006.01)
(Continued)

(52) U.S. Cl.
CPC ......... *H02J 7/007* (2013.01); *H02M 3/33573* (2021.05); *H02M 3/33576* (2013.01);
(Continued)

(58) Field of Classification Search
CPC .. H02J 7/007; H02J 2207/20; H02M 3/33573; H02M 3/33576; H02M 3/33584; B60L 53/14; B60L 53/63
(Continued)

(56) References Cited

U.S. PATENT DOCUMENTS 9,780,675 B2 * 10/2017 El-Barbari ........ H02M 3/33576
10,389,166 B1 * 8/2019 Sahoo ................. H02J 7/00716
(Continued)

OTHER PUBLICATIONS

Zou et al., "Modelling and control of a triple-active-bridge converter", IET Power Electronics, vol. 13, Issue 5, 2019, pp. 961-969.
(Continued)

*Primary Examiner* — Drew A Dunn
*Assistant Examiner* — Aaron Piggush
(74) *Attorney, Agent, or Firm* — Haley Guiliano LLP

(57) ABSTRACT

Systems and methods for controlling a dual active bridge converter or other type of DC-DC converter are disclosed herein. An output voltage of the dual active bridge converter is detected. Based at least in part on the output voltage, a first target duty ratio of a primary bridge of the dual active bridge converter and a second target duty ratio of a secondary bridge of the dual active bridge converter are retrieved from a table. Based on the output voltage, a target phase shift between the primary bridge and the secondary bridge is determined. Based on the first target duty ratio, the second target duty ratio, and the target phase shift, a plurality of switch control signals is caused to be provided to respective switches of the primary bridge and the secondary bridge, to switch according to a time-based switching sequence.

20 Claims, 7 Drawing Sheets

(51) Int. Cl.
*B60L 53/14* (2019.01)
*B60L 53/63* (2019.01)

(52) U.S. Cl.
CPC ......... *H02M 3/33584* (2013.01); *B60L 53/14* (2019.02); *B60L 53/63* (2019.02); *H02J 2207/20* (2020.01)

(58) Field of Classification Search
USPC ................ 320/104, 108, 109, 142, 157, 158
See application file for complete search history.

(56) References Cited

U.S. PATENT DOCUMENTS

| | | | | |
|---|---|---|---|---|
| 10,673,343 | B1 * | 6/2020 | Tong | H02M 3/33584 |
| 2011/0249472 | A1 * | 10/2011 | Jain | H02M 3/33584 363/15 |
| 2019/0073021 | A1 * | 3/2019 | Schramm | H02M 3/33584 |
| 2020/0313443 | A1 * | 10/2020 | ElMenshawy | H02J 7/007 |
| 2020/0324665 | A1 * | 10/2020 | Mackenzie | B60L 53/63 |
| 2021/0155100 | A1 * | 5/2021 | Khaligh | B60L 53/14 |

OTHER PUBLICATIONS

Bhattacharjee et al., "Analytical Solution For Minimum RMS Current and Reactive Power Modulation of A Soft Switched Dual Active Bridge Converter." In: 2019 IEEE Energy Conversion Congress and Exposition (ECCE), 2019, pp. 1321-1327.

Li et al., "Global Optimization for Dual Active Bridge Converters to Minimize RMS Current." In: 2020 IEEE Energy Conversion Congress and Exposition (ECCE), 2020, pp. 5648-5655.

Mou et al., "Hybrid Duty Modulation for Dual Active Bridge Converter to Minimize RMS Current and Extend Soft-Switching Range Using the Frequency Domain Analysis." In: IEEE Transactions on Power Electronics, vol. 36, Sep. 7, 2020, Issue: 4, pp. 4738-4751.

Zahin et al., "An Alternative Dual Active Bridge Modulation to Minimize RMS Current and Extend ZVS Range." In: 2020 IEEE Energy Conversion Congress and Exposition (ECCE), 2020, pp. 5952-5959.

* cited by examiner

HYBRID OPTIMIZED CONTROL FOR DC-DC CONVERTER

CROSS-REFERENCE TO RELATED APPLICATION

This application claims priority to U.S. Provisional Patent Application No. 63/239,962, filed on Sep. 2, 2021, the entire contents of which are hereby expressly incorporated by reference in their entirety.

INTRODUCTION

The present disclosure relates to direct-current-to-direct-current (DC-DC) converters and, more particularly, to systems and related processes for controlling a DC-DC converter using hybrid optimized control to ensure robust control performance and high-power conversion efficiency over a wide output range.

SUMMARY

DC-DC converters are utilized to provide DC-DC conversion for a multitude of applications. One such application is an electric vehicle charging station, in which a DC-DC converter receives a DC voltage derived from an AC power grid, converts the received DC voltage to another DC voltage, and provides the converted DC voltage to a charging port of an electric vehicle. In one approach, a fundamental-harmonic-approximation (FHA) model is implemented for a DC-DC resonant converter for the frequency domain analysis. Although, in some embodiments, the FHA model may work accurately near a resonant frequency point of the DC-DC converter, the accuracy of the FHA model may decline for pulse-width-modulated (PWM) converters as generated waveforms are no longer sinusoidal, which may lead to large amounts of higher harmonic components that are not considered by the FHA model. For improved efficiency, the present disclosure provides systems and methods for controlling a DC-DC converter (e.g., a dual active bridge converter) using hybrid optimized control to ensure robust control performance and high-power conversion efficiency over a wide output range, particularly for applications like electric vehicle charging, in which the output voltage of the dual active bridge converter varies widely owing to the output load variations during a charging cycle. For example, the present disclosure utilizes a generalized harmonic approximation (GHA) model that accounts for higher odd-order harmonics. Such control of a dual active bridge converter (or other types of DC-DC converters) is advantageous over conventional control methods that may not operate efficiently during operation with large phase-shifted angles, due to inaccuracies in the FHA model.

A method for controlling a dual active bridge converter, a system for controlling a dual active bridge converter, and a method of generating a table of control variables for controlling a dual active bridge converter across an output range are provided. The method for controlling the dual active bridge converter includes detecting an output voltage of the dual active bridge converter, and retrieving, from a table, a first target duty ratio of a primary bridge of the dual active bridge converter and a second target duty ratio of a secondary bridge of the dual active bridge converter, based on the output voltage. The method further includes determining a target phase shift between the primary bridge and the secondary bridge, based on the output voltage, and causing a plurality of switch control signals, which are provided to respective switches of the primary bridge and the secondary bridge, to switch according to a time-based switching sequence based on the first target duty ratio, the second target duty ratio, and the target phase shift.

In some embodiments, each of the first target duty ratio, the second target duty ratio, and the target phase shift may be associated with a desired output current of the dual active bridge converter.

In some embodiments, the desired output current may be selected from among a maximum output current of the dual active bridge converter and a maximum output power of the dual active bridge converter, based on the output voltage.

In some embodiments, the determining the target phase shift may include retrieving, from the table, the target phase shift based on the output voltage.

In some embodiments, the determining the target phase shift may further include adjusting the retrieved target phase shift based on a comparison between the output voltage and a reference voltage.

In some embodiments, the determining the target phase shift may include calculating the target phase shift based on a first comparison between the output voltage and a reference voltage and a second comparison between an output current of the dual active bridge controller and a reference current.

In some embodiments, the method may further include determining, in advance of providing the plurality of switch control signals to the respective switches of the primary bridge and the secondary bridge, values in the table by using a GHA model to optimize a plurality of control variables.

In some embodiments, the determining the values in the table may include determining, for each voltage at predetermined intervals within a voltage operating range of the dual active bridge converter, the plurality of control variables for at least one output current of the dual active bridge converter by minimizing an expression representing a primary winding current of the dual active bridge converter, the plurality of control variables may include the first target duty ratio, the second target duty ratio, and the target phase shift.

In some embodiments of the present disclosure, the minimizing the primary winding current may include minimizing the following expression:

$$I_{RMS} = \sqrt{\sum_{k=1}^{2i+1} \frac{\langle V_{pri}\rangle_k^2 + \langle V_{sec}\rangle_k^2 - 2\langle V_{pri}\rangle_k \langle V_{sec}\rangle_k \cos(k\varphi)}{2k^2 \pi f_s L}},$$

where $I_{RMS}$ is the primary winding current, $$\langle V_{pri}\rangle_k = \frac{4V_{in}}{k\pi}\cos(k\delta_1),$$

$$\langle V_{sec}\rangle_k = \frac{4V_{out}}{k\pi}\cos(k\delta_2),$$

$\varphi$ is the phase shift, $\delta_1$ is the first target duty ratio, $\delta_2$ is the second target duty ratio, $V_{in}$ is an input voltage of the primary bridge, $V_{OUT}$ is the output voltage, L is an inductance of an inductor of the dual active bridge converter, and $f_s$ is a switching frequency of the respective switches of the primary bridge and the secondary bridge.

In some embodiments of the present disclosure, the determining the output voltage may include detecting a signal level at an output port of the dual active bridge converter that is coupled to a rechargeable battery.

In some embodiments of the present disclosure, a system for controlling a dual active bridge converter is provided. The system includes a memory storing instructions and a table, an input port coupled to an output port of the dual active bridge converter, a plurality of output ports coupled to switches of the dual active bridge converter, and control circuitry coupled to the memory, the input port, and the plurality of output ports. The control circuitry may be configured to execute the stored instructions to determine an output voltage of the dual active bridge converter via the input port, and retrieve, from the table, a first target duty ratio of a primary bridge of the dual active bridge converter and a second target duty ratio of a secondary bridge of the dual active bridge converter, based on the output voltage. The control circuitry may be further configured to execute the stored instructions to determine a target phase shift between the primary bridge and the secondary bridge, based on the output voltage, and cause a plurality of switch control signals, which are provided to respective switches of the primary bridge and the secondary bridge via the plurality of output ports, to switch according to a time-based switching sequence based on the first target duty ratio, the second target duty ratio, and the target phase shift.

In some embodiments of the present disclosure, each of the first target duty ratio, the second target duty ratio, and the target phase shift may be associated with a desired output current of the dual active bridge converter.

In some embodiments of the present disclosure, the control circuitry may be further configured to select the desired output current from among a maximum output current of the dual active bridge converter and a maximum output power of the dual active bridge converter, based on the output voltage.

In some embodiments of the present disclosure, the control circuitry may be further configured, when determining the target phase shift, to retrieve, from the table, the target phase shift based on the output voltage.

In some embodiments of the present disclosure, the control circuitry may be further configured, when determining the target phase shift, to adjust the retrieved target phase shift based on a comparison between the output voltage and a reference voltage.

In some embodiments of the present disclosure, the control circuitry may be further configured, when determining the target phase shift, to calculate the target phase shift based on a first comparison between the output voltage and a reference voltage and a second comparison between an output current of the dual active bridge controller and a reference current.

In some embodiments of the present disclosure, the control circuitry may be further configured to determine, in advance of providing the plurality of switch control signals to the respective switches of the primary bridge and the secondary bridge, values in the table by using a GHA model to optimize a plurality of control variables; and, when determining the values in the table, to determine for each voltage at predetermined intervals within a voltage operating range of the dual active bridge converter, the plurality of control variables for at least one output current of the dual active bridge converter by minimizing an expression representing a primary winding current of the dual active bridge converter. The plurality of control variables may include the first target duty ratio, the second target duty ratio, and the target phase shift.

In some embodiments of the present disclosure, the control circuitry may be further configured, when minimizing the expression representing the primary winding current, to minimize the following expression:

$$I_{RMS} = \sqrt{\sum_{k=1}^{2i+1} \frac{\langle V_{pri}\rangle_k^2 + \langle V_{sec}\rangle_k^2 - 2\langle V_{pri}\rangle_k \langle V_{sec}\rangle_k \cos(k\varphi)}{2k^2 \pi f_s L}},$$

where $I_{RMS}$ is the primary winding current, $$\langle V_{pri}\rangle_k = \frac{4V_{in}}{k\pi}\cos(k\delta_1), \langle V_{sec}\rangle_k = \frac{4V_{out}}{k\pi}\cos(k\delta_2),$$

$\varphi$ is the phase shift, $\delta_1$ is the first target duty ratio, $\delta_2$ is the second target duty ratio, $V_{in}$ is an input voltage of the primary bridge, $V_{out}$ is the output voltage, L is an inductance of an inductor of the dual active bridge converter, and $f_s$ is a switching frequency of the respective switches of the primary bridge and the secondary bridge.

In some embodiments of the present disclosure, the control circuitry may be further coupled to a second output port, and may be further configured, when determining the output voltage, to detect a signal level at the second output port of the dual active bridge converter that is coupled to a rechargeable battery.

In some embodiments of the present disclosure, a method for generating a table of control variables for controlling a dual active bridge converter across an output voltage range is provided. The method includes determining, for each output voltage and target current pair in the table, values in the table by using a GHA model to optimize a plurality of control variables by minimizing an expression representing a primary winding current of the dual active bridge converter. The method further includes, for each output voltage and target current pair, storing, in association with a respective output voltage and target current pair, the optimized plurality of control variables.

BRIEF DESCRIPTION OF THE DRAWINGS

The above and other objects and advantages of the disclosure will be apparent upon consideration of the following detailed description, taken in conjunction with the accompanying drawings, in which like reference characters refer to like parts throughout, and in which.

DETAILED DESCRIPTION

Figure 1:
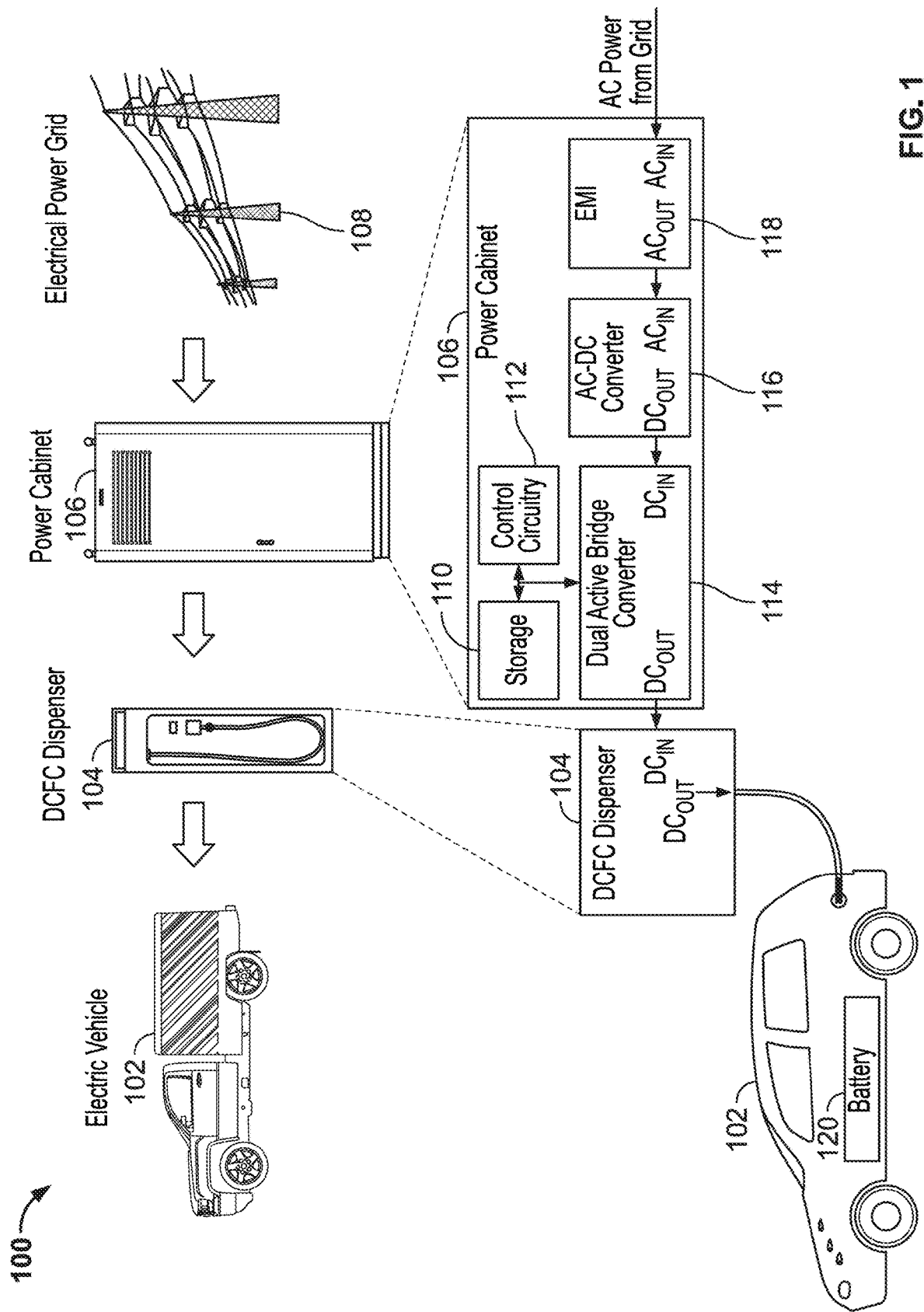
FIG. 1 shows an illustrative block diagram of an electric vehicle charging system, in accordance with some embodiments of the disclosure.

FIG. 1 shows an illustrative block diagram of an electric vehicle charging system 100, in accordance with some embodiments of the disclosure. System 100 includes electric vehicle 102, direct current fast charger (DCFC) dispenser 104, power cabinet 106, and electrical power grid 108. Electric vehicle 102 includes rechargeable battery 120. Power cabinet 106 includes storage 110, control circuitry 112, dual active bridge (DAB) converter 114, AC-DC converter 116, and electromagnetic interference filter (EMI) 118. Power cabinet 106 is coupled to electrical power grid 108 via one or more wired electrical power signal paths, by which electrical power grid 108 provides alternating current (AC) electrical power, such as in the form of a three-phase 480 volt (V) 60 hertz (Hz) signal, to power cabinet 106. EMI 118 performs filtering upon the AC electrical power received from electrical power grid 108 to mitigate high frequency electromagnetic noise, and outputs a filtered AC power signal to AC-DC converter 116. AC-DC converter 116 converts the filtered AC power signal received from EMI circuitry 118 into a DC signal, such as a signal fixed at a voltage in a range from 200 to 100V and a maximum current of 125 amps (A) at a maximum power of 50 kilowatts (kW). AC-DC converter 116 provides the DC signal to DAB converter 114, which converts the received DC signal into an output DC signal that is provided, by way of DCFC dispenser 104, to charge battery 120 via a charging port of electric vehicle 102. As described in further detail below, control circuitry 112, which is electrically coupled to storage 110 and DAB converter 114, is configured to adaptively control DAB converter 114 to transfer power to battery 120 in an efficient manner by utilizing control variables that are calculated using an offline optimization process that is conducted using a GHA model, as described in further detail below.

Figure 2:
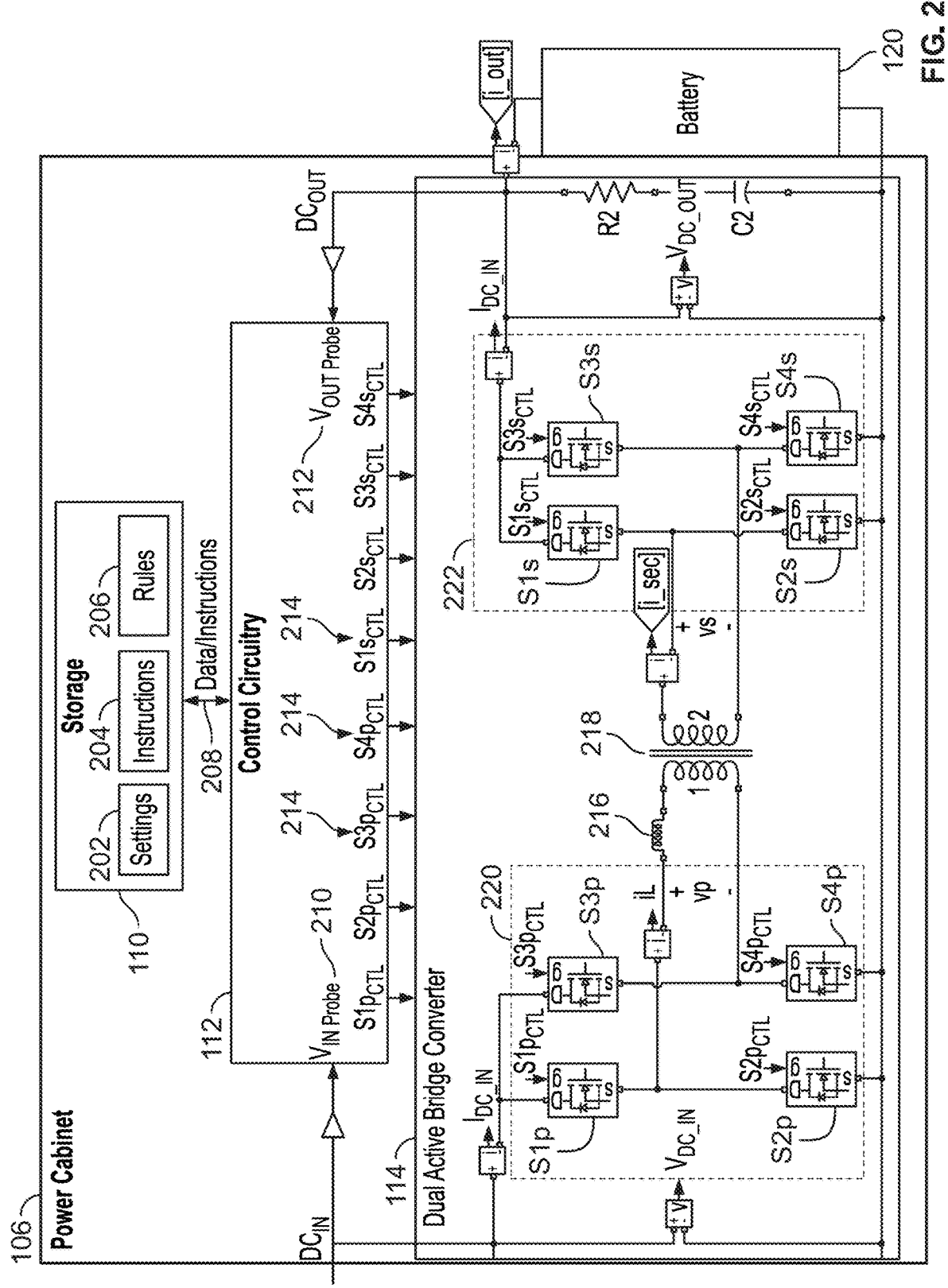
FIG. 2 is an illustrative block diagram showing additional details of some components of a power cabinet, in accordance with some embodiments of the disclosure.

FIG. 2 is an illustrative block diagram showing additional details of some components of power cabinet 106, in accordance with some embodiments of the disclosure. Storage 110 may be an electronic storage device. As referred to herein, the phrase "electronic storage device" or "storage device" should be understood to mean any device for storing electronic data, computer software, or firmware, such as random-access memory, read-only memory, solid state devices, or any other suitable fixed or removable storage devices, and/or any combination of the same. Storage 110 may be used to store various types of instructions, rules, and/or other types of data. In some embodiments, control circuitry 112 executes instructions for an application stored in storage 110. Specifically, control circuitry 112 may be instructed by the application to perform the functions discussed herein. In some implementations, any action performed by control circuitry 112 may be based on instructions received from the application. For example, the application may be implemented as software or a set of executable instructions that may be stored in storage 110 and executed by control circuitry 112.

Storage 110, in some aspects, stores settings 202, instructions 204, and rules 206. Example types of settings 202 may include power transfer settings, such as a maximum power transfer level for DAB converter 114; a maximum current level for DAB converter 114, a switching frequency for DAB converter 114, and/or other types of settings. Example types of rules 206 may include computational constants (e.g., values of inductors and/or transformers of DAB converter 114), lookup tables that match output voltage levels with corresponding phase shift amounts and duty ratios of DAB converter 114 designed to satisfy specified constraints (e.g., achieve zero voltage switching, minimize circulating energy, etc.), equations for computing phase shifts, equations for determining control variables to store in a lookup table (e.g., a GHA lookup table), instructions to drive DAB converter 114 based on retrieved control variables, etc. In some aspects, instructions 204 are executed by control circuitry 112 to implement steps of various methods described herein.

DAB converter 114 includes transformer 218, a primary side bridge 220 and a secondary side bridge 222. Primary side bridge is coupled to a primary side of transformer 218 via series inductor 216. Secondary side bridge 222 is coupled to a secondary side of transformer 218. As used herein, the "primary side" of DAB converter 114 refers to the portion of DAB converter 114 appearing to the left of transformer 218 in FIG. 2, and the "secondary side" of DAB converter 114 refers to the portion of DAB converter 114 appearing to the right of transformer 218 in FIG. 2. As used herein, Vp and Vs refer to the voltage on the primary side of transformer 218 and the voltage on the secondary side of transformer 218, respectively. DAB converter 114 also includes primary side switches S1p, S2p, S3p, and S4p located on the primary side of DAB converter 114 and secondary side switches S1s, S2s, S3s, and S4s located on the secondary side of DAB converter 114. Switches S1p, S2p, S3p, S4p, S1s, S2s, S3s, and S4s may be any suitable type of electronic switch, such as a field effect transistor (FET)-based switch, that can be switched on/closed (e.g., during which current is permitted to be conducted between its source and drain terminal) or off/open (e.g., during which current is effectively prevented from being conducted between its source and drain terminal) by changing a logic level of the control signal provided to its gate terminal, for example from a logic-high to a logic-low.

Control circuitry 112 includes storage interface port 208, first input port 210 ($V_{IN\ Probe}$), second input port 212 ($V_{OUT\ Probe}$), and multiple output ports 214. Control circuitry 112 is configured to transmit and receive instructions, settings, rules, and/or other types of data to and from storage 110 via storage interface port 208. Control circuitry 112 is configured to sense an input voltage ($V_{IN}$) of DAB converter 114 via first input port 210. Control circuitry 112 is configured to sense an output voltage ($V_O$) of DAB converter 114 via second input port 212 ($V_{OUT\ Probe}$).

Output ports 214 include primary switching control ports $S1p_{CTL}$, $S2p_{CTL}$, $S3p_{CTL}$, and $S4p_{CTL}$, by which control circuitry 112 provides respective switching control signals to respective switching control ports $S1p_{CTL}$, $S2p_{CTL}$, $S3p_{CTL}$, and $S4p_{CTL}$ of primary side switches S1p, S2p, S3p, and S4p. Output ports 214 also include secondary switching control ports $S1s_{CTL}$, $S2s_{CTL}$, $S3s_{CTL}$, and $S4s_{CTL}$, by which control circuitry 112 provides respective switching control signals to respective switching control ports $S1s_{CTL}$, $S2s_{CTL}$, $S3s_{CTL}$, and $S4s_{CTL}$ of secondary side switches S1s, S2s, S3s, and S4s, respectively. Complete signal paths from switching control ports $S1p_{CTL}$, $S2p_{CTL}$, $S3p_{CTL}$, $S4p_{CTL}$, $S1s_{CTL}$, $S2s_{CTL}$, $S3s_{CTL}$, and $S4s_{CTL}$ of control circuitry 112 to $S1p_{CTL}$, $S2p_{CTL}$, $S3p_{CTL}$, $S4p_{CTL}$, $S1s_{CTL}$, $S2s_{CTL}$, $S3s_{CTL}$, and $S4s_{CTL}$ of DAB 114 are omitted from FIG. 2 for clarity. Nonetheless, switching control ports $S1p_{CTL}$, $S2p_{CTL}$, $S3p_{CTL}$, $S4p_{CTL}$, $S1s_{CTL}$, $S2s_{CTL}$, $S3s_{CTL}$, and $S4s_{CTL}$ of control circuitry 112 are indeed coupled to $S1p_{CTL}$, $S2p_{CTL}$, $S3p_{CTL}$, $S4p_{CTL}$, $S1s_{CTL}$, $S2s_{CTL}$, $S3s_{CTL}$, and $S4s_{CTL}$ of DAB 114 via respective signal paths. Control circuitry 112 provides respective switching control signals based on determined control variables (e.g., a phase shift ($\varphi$) between the bridge voltages, a duty ratio the primary side of DAB 114 ($\delta_1$), a duty ratio the secondary side of DAB 114 ($\delta_2$), a switching frequency of DAB 114 ($f_s$)). For example, control circuitry 112 may include a clock and generate respective switching control signals according to various suitable control methods based on the clock and the determined control variables. Although a DAB is described, the systems and methods discussed herein may be utilized for any DC-DC converter employing PWM in order to, e.g., minimize circulating energy and snubber capacitor current stress, realize tight regulation, temperature balancing between switches, and soft switching operation.

Figure 3:
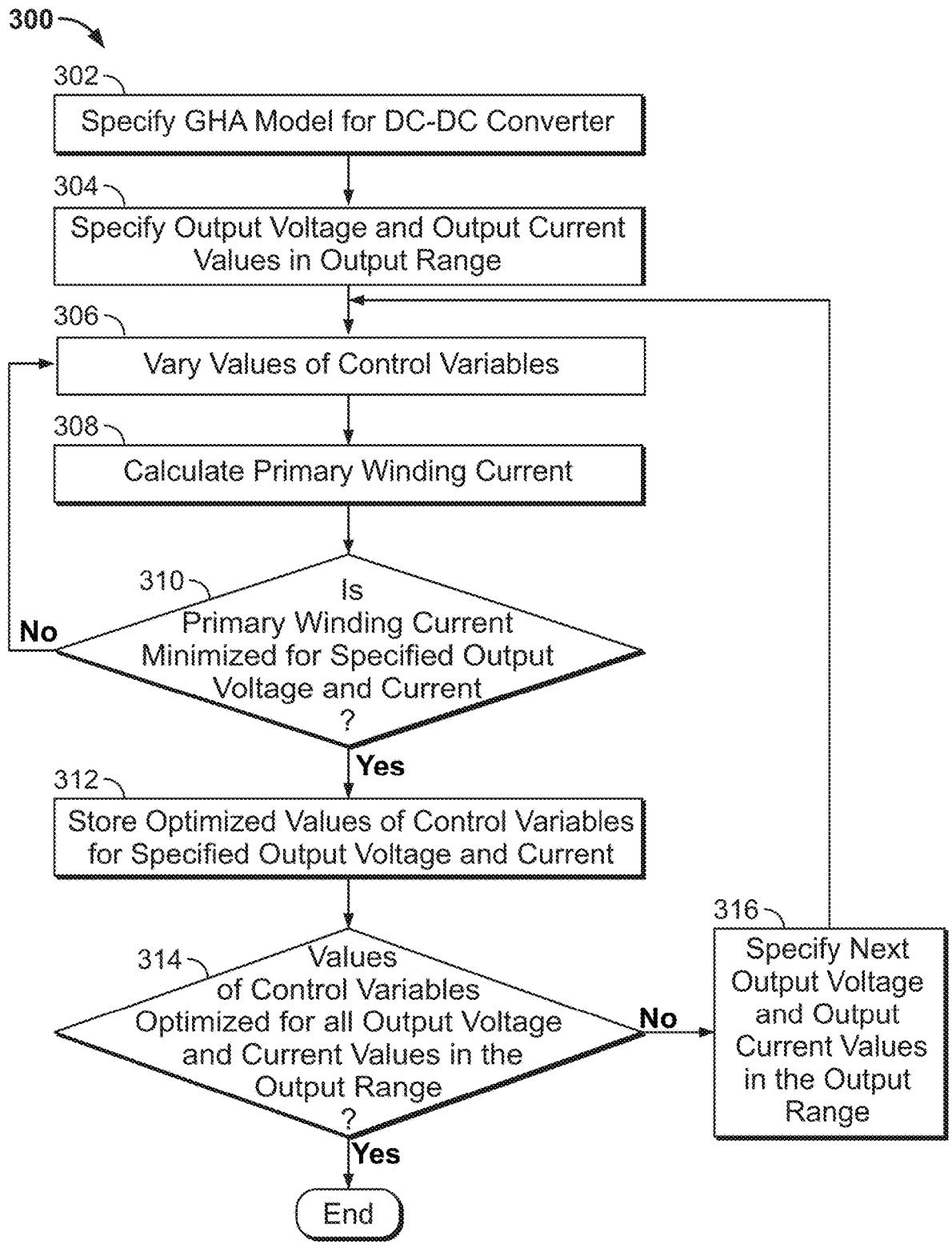
FIG. 3 depicts an illustrative flowchart of a process for generating a GHA lookup table of optimized control variables for controlling a dual active bridge converter using a GHA model, in accordance with some embodiments of the present disclosure.

FIG. 3 depicts an illustrative flowchart of a process 300 for generating a lookup table (e.g., GHA lookup table 400 of FIG. 4) of optimized control variables for controlling DAB 114 using a GHA model, in accordance with some embodiments of the present disclosure. Process 300 may be performed in advance of the operation of DAB 114 (e.g., an offline process). Although process 300 is described as being performed by control circuitry 112, it should be understood that process 300 may be performed by any suitable control circuitry.

At 302, control circuitry 112 specifies a GHA model for a DC-DC converter. For example, control circuitry 112 specifies a GHA model for a dual active bridge converter (e.g., DAB 114) by the following expressions, based on the characteristics of the DAB 114. In one example, the $k^{th}$ harmonic order primary bridge voltage is defined by expression (1) below, and the $k^{th}$ harmonic order secondary bridge voltage is defined by expression (2) below $$\langle V_{pri}\rangle_k = \frac{4V_{in}}{k\pi}\cos(k\delta_1), \quad (1)$$

$$\langle V_{sec}\rangle_k = \frac{4V_{out}}{k\pi}\cos(k\delta_2), \quad (2)$$

where $\delta_1$ is the first target duty ratio of primary side switches S1p, S2p, S3p, and S4p, $\delta_2$ is the second target duty ratio secondary side switches S1s, S2s, S3s, and S4s, Vis the input voltage ($V_{IN}$) of DAB converter 114, $V_{OUT}$ is the output voltage ($V_O$) of DAB converter 114.

The transferred power is defined by expression (3) below $$P_{12} = \sum_{k=1}^{2i+1} \frac{\langle V_{pri}\rangle_k \cdot \langle V_{sec}\rangle_k \sin(k\varphi)}{4k^2\pi f_s L}, \quad (3)$$

where $\varphi$ is a phase shift between the bridge voltages, L is an inductance of the inductor 216, and fs is a switching frequency of DAB 114.

The primary winding current root mean-square value, which is used as the optimization objective function, is defined by expression (4) below $$I_{RMS} = \sqrt{\sum_{k=1}^{2i+1} \frac{\langle V_{pri}\rangle_k^2 + \langle V_{sec}\rangle_k^2 - 2\langle V_{pri}\rangle_k \langle V_{sec}\rangle_k \cos(k\varphi)}{2k^2\pi f_s L}} \quad (4)$$

At 304, control circuitry 112 specifies a first output voltage and output current for which to optimize control variables using the specified GHA model. For example, control circuitry 112 may specify output voltages and currents within the output range of DAB 114 at predetermined intervals to build the lookup table. In one example, shown in greater detail in FIG. 4, the output voltage range of DAB 114 may be from 200V-100V, the output current of DAB 114 may be limited to 125A, and the output power of DAB 114 may be limited to 50 kW. In this example, the control circuitry 112 may specify output voltages values from 200V-1000V at 10V intervals and output currents from 1 A-125 A at 10 A intervals. By performing control variable optimizations for voltages/currents only at certain intervals, processing may be reduced, while still maintaining precise control variables using linear interpolation, as described in further detail below.

At 306, 308, and 310, after specifying a first output voltage and output current pair (e.g., 200V, 1A) within the output voltage and output current range, control circuitry 112 varies values of control variables in the GHA model to find the control variables that minimize the primary winding current root mean-square value (e.g., to minimize circulating energy and snubber capacitor current stress), as specified by expression (4) above. In some examples, control circuitry 112 may consider other factors specified in a constraint matrix (e.g., to realize tight regulation, temperature balancing between different switches, soft switching operation, etc.) when optimizing control variables. In one example, the optimized control variables may include $\delta_1$, $\delta_2$, and cp. In some embodiments, $f_s$ may also be included an optimized control variable. Control circuitry 112 may use a convergence function to perform steps 306, 308, and 310. At step 310, if the primary winding current is minimized (and other specified constraints are satisfied) for the specified output voltage and current ("Yes" at 310), process 300 proceeds to 312. Otherwise ("No" at 310), control circuitry 112 returns to 206 and continues to optimize the control variables.

Figure 4:
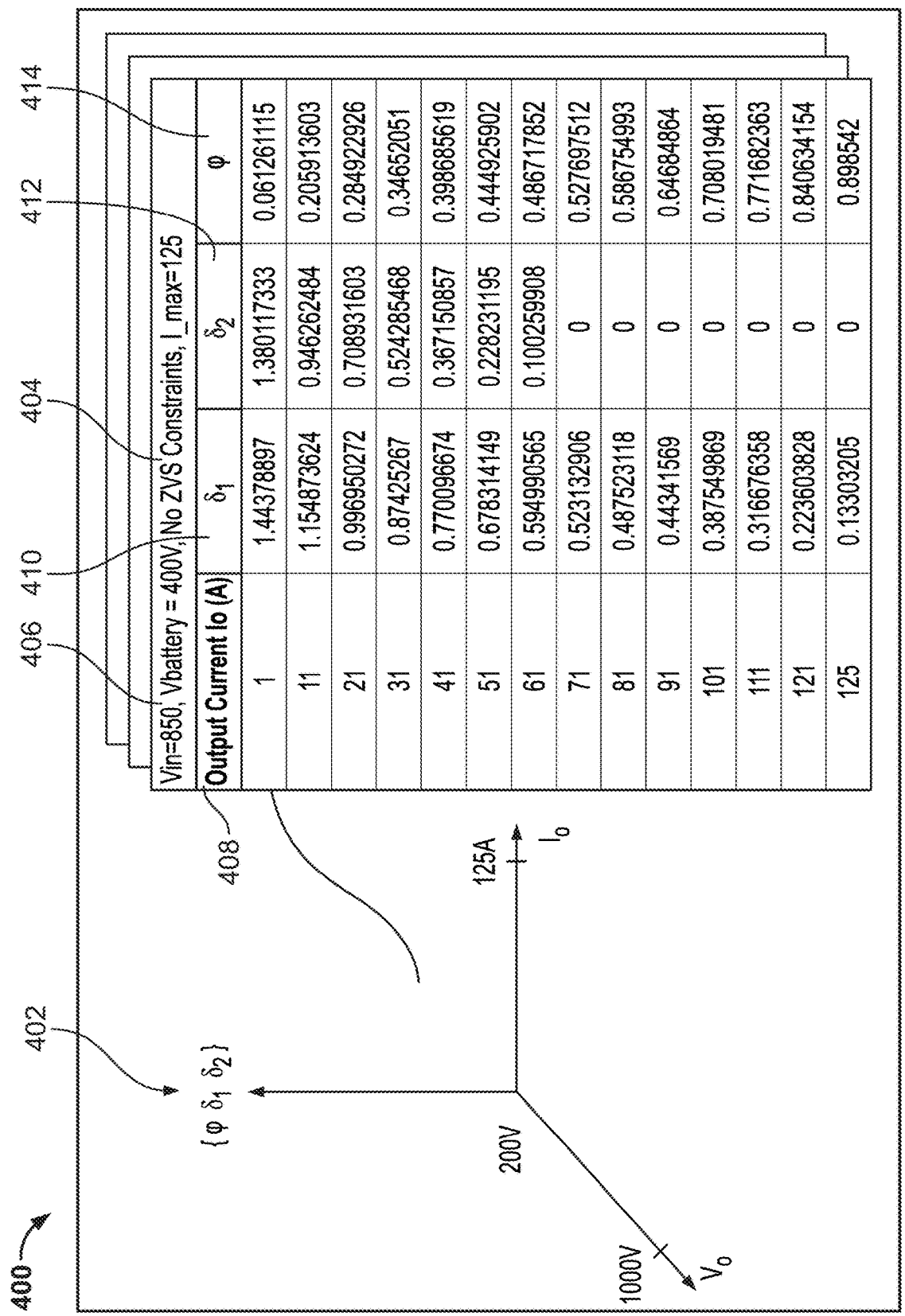
FIG. 4 shows an example of a partial GHA lookup table, in accordance with some embodiments of the present disclosure.

At 312, control circuitry 112 stores (e.g., in storage 202) the optimized control variables for the specified output voltage and current, as shown in greater detail with reference to FIG. 4.

At 314, control circuitry 112 determines whether values of the control variables have been optimized for all output voltage and current values in the output range. That is, control circuitry 112 determines if the generation of the lookup table is complete. If control circuitry 112 determines that values of the control variables have not been optimized for all output voltage and current values in the output range ("No" at 314), process 300 proceeds to 316. Otherwise ("Yes" at 314), process 300 ends.

At 316, control circuitry 112 specifies the next output voltage and output current pair and repeats the above-discussed steps to optimize the control variable for the next output voltage and output current pair.

FIG. 4 shows an example of a partial GHA lookup table 400, in accordance with some embodiments of the present disclosure. As shown, the illustrated portion of GHA lookup table 400 includes three optimized control variables ($\delta_1$ 410, $\delta_2$ 412, and $\varphi$ 414) at an output voltage (Vbattery 406) of 400V for a DAB 114 with a maximum output current of 125 A and an output voltage range from 200V-1000V. As shown, optimized control variables 402 are stored for current intervals 408 of 10A (e.g., 1A, 11A, 21A, etc.) As shown, the optimized control variables 402 may not be determined with any specified zero-voltage switching (ZVS) constraints 404. However, this is only an example, and optimized control variables 402 may have been optimized in view of any desired constraints. As explained in greater detail below, control circuitry 112 may retrieve optimized control variables 402 based on the output voltage ($V_o$) of DAB converter 114 and the output current ($I_o$) of DAB converter 114, and use the retrieved optimized control variables 402 to drive DAB converter 114.

Figure 5:
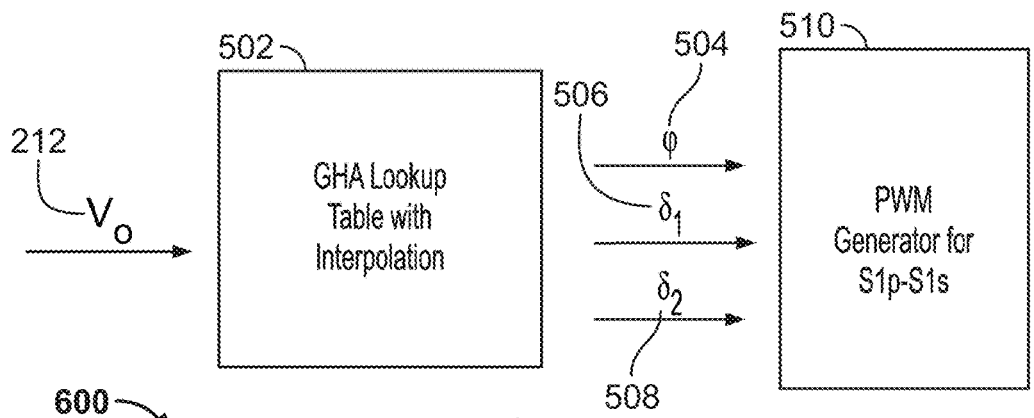
FIG. 5 is an illustrative block diagram of control circuitry for implementing a first control process for a dual active bridge converter, in accordance with some embodiments of the present disclosure.

FIG. 5 is an illustrative block diagram of control circuitry for implementing a first control process for DAB 114, in accordance with some embodiments of the present disclosure. The first control process may be implemented by control circuitry 112 of FIG. 1. As shown, all three control variables $\varphi$, $\delta_1$, and $\delta_2$ (504, 506, 508) are retrieved from GHA lookup table 502, based on the detected output voltage ($V_O$) of DAB converter 114 and power transfer requirements, as explained in further detail with reference to FIG. 6. Based on the retrieved control variables $\varphi$, $\delta_1$, and $\delta_2$ (504, 506, 508), PWM generator 510 may generate control signals (S1$p_{CTL}$, S2$p_{CTL}$, S3$p_{CTL}$, S4$p_{CTL}$, S1$s_{CTL}$, S2$s_{CTL}$, S3$s_{CTL}$, and S4$s_{CTL}$) for controlling the switches (S1$p$, S2$p$, S3$p$, S4$p$, S1$s$, S2$s$, S3$s$, and S4$s$) of DAB 114.

Figure 6:
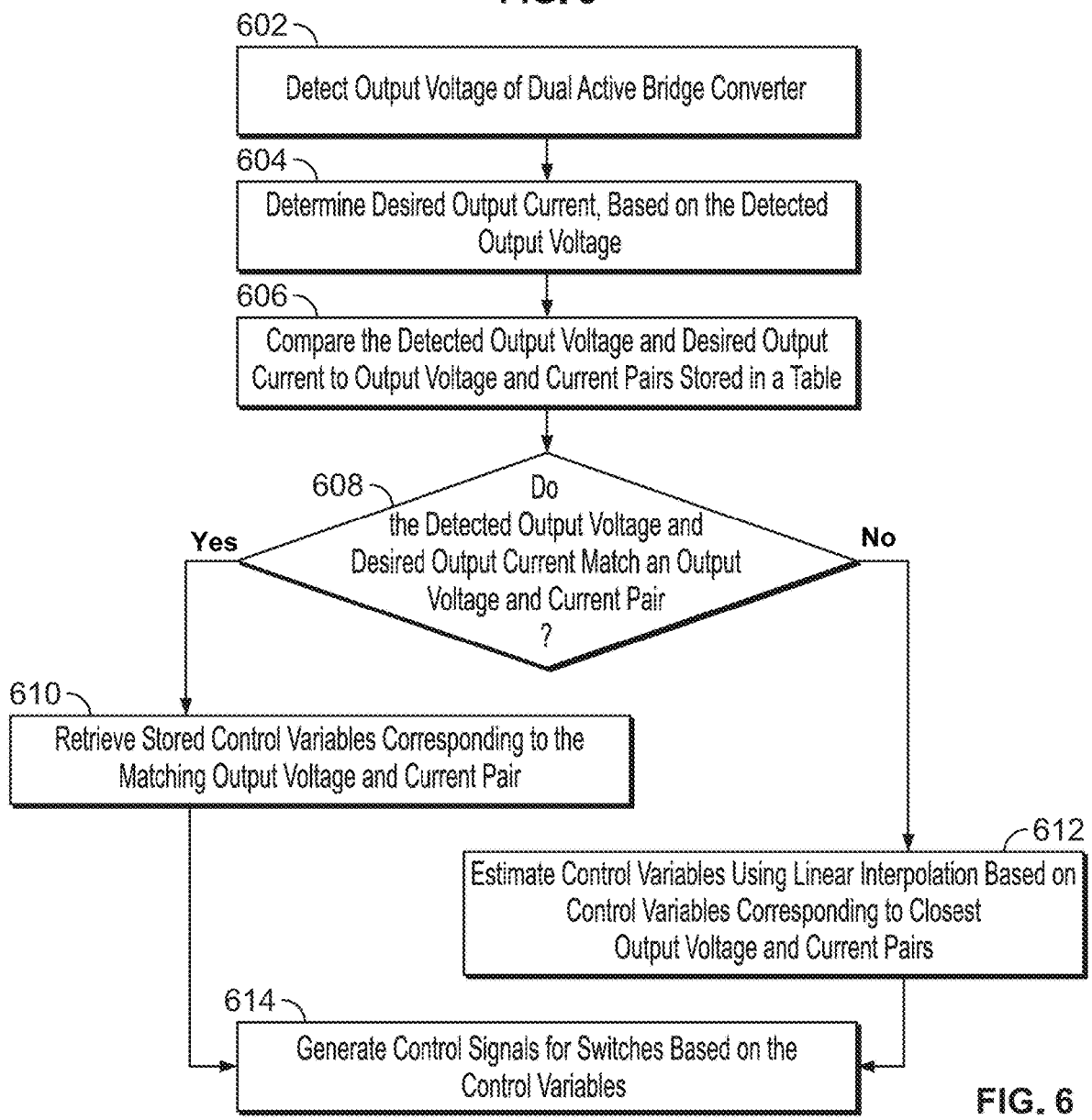
FIG. 6 depicts an illustrative flowchart of the first control process of FIG. 5, in accordance with some embodiments of the present disclosure.

FIG. 6 depicts an illustrative flowchart of the first control process of FIG. 5, in accordance with some embodiments of the present disclosure. At 602, control circuitry 112 detects the output voltage ($V_O$) of DAB converter 114 via second input port 212 ($V_{OUT}$ Probe).

At 604, control circuitry 112 determines a desired output current, based on the detected output voltage. In some embodiments, the desired output current may be selected based on the maximum current output of DAB 114 or the maximum power output of DAB 114. For example, if the maximum current output of DAB 114 is 125A and the maximum power output of DAB 114 is 50 kW, control circuitry 112 may determine the desired output current as 125A for detected output voltages less than or equal to 400V. Above 400V, control circuitry 112 may determine the desired output current based on the maximum power output of DAB 114. For example, if the detected output voltage is 500V, control circuitry 112 may determine the desired output current as 100A (i.e., 50 kW). In some embodiments, control circuitry 112 may determine the desired output current based on a charging mode (e.g., constant current, constant power, constant voltage) or limits of the connected load (e.g., battery 120 of FIG. 2).

At 606, control circuitry 112 compares the detected output voltage and desired output current to output voltage and current pairs stored in a table (e.g., GHA lookup table 502).

At 608, control circuitry 112 determines if the detected output voltage and desired output current match an output voltage and current pair in the table. For example, control circuitry 112 determines if there is an exact match between the detected output voltage and desired output current and an output voltage and current pair in the table. In response to determining that there is not a match ("No" at 608), processing proceeds to 612. Otherwise ("Yes" at 608), processing proceeds to 610.

At 610, control circuitry 112 retrieves stored control variables corresponding to the matching output voltage and current pair. For example, with reference to FIG. 4, if the detected voltage and desired output current is (400V, 125A), control circuitry 112 retrieves the following control values: $\varphi$=0.898542, $\delta_1$=0.13303205, and $\delta_2$=0 (e.g., with $V_{IN}$=850V and no ZVS constraints).

At 612, control circuitry 112 estimates control variables using linear interpolation based on control variables corresponding to the closest output voltage and current pairs.

At 614, control circuitry 112 generates control signals (S1$p_{CTL}$, S2$p_{CTL}$, S3$p_{CTL}$, S4$p_{CTL}$, S1$s_{CTL}$, S2$s_{CTL}$, S3$s_{CTL}$, and S4$s_{CTL}$) for controlling the switches (S1$p$, S2$p$, S3$p$, S4$p$, S1$s$, S2$s$, S3$s$, and S4$s$) of DAB 114 based on the retrieved/estimated control variables.

Figure 7:
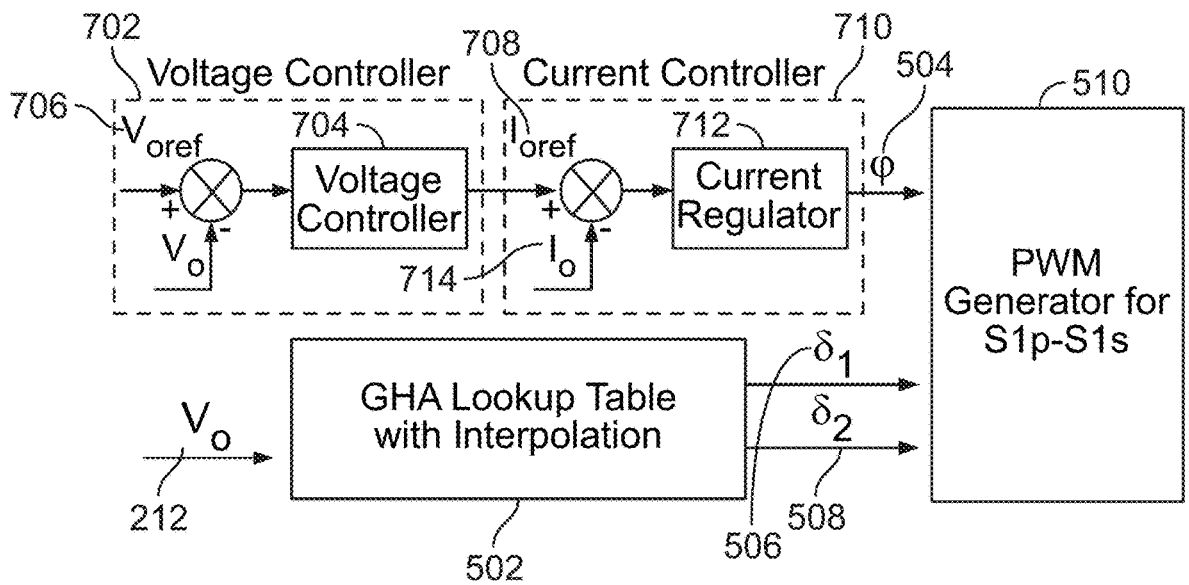
FIG. 7 is an illustrative block diagram of control circuitry for implementing a second control process for a dual active bridge converter, in accordance with some embodiments of the present disclosure.

FIG. 7 is an illustrative block diagram of control circuitry for implementing a second control process for DAB 114, in accordance with some embodiments of the present disclosure. FIG. 7 may correspond to FIG. 5 except that instead of retrieving control variable $\varphi$ 504 from GHA lookup table 502, control circuitry 112 may compute control variable $\varphi$ 504 in real time from voltage controller 702 and current controller 710. In some embodiments, variable change for inner phase shifts may be implemented to achieve a smooth transient. Control variables $\delta_1$ and $\delta_2$ (506, 508) may be retrieved from GHA lookup table 502 as described above with reference to FIG. 5.

As shown, voltage controller 702 may compare reference voltage 706 ($V_{oref}$) with the detected output voltage ($V_O$) of DAB converter 114 and input a result of the comparison into voltage regulator 704 to generate reference current 708 ($I_{oref}$). Current controller 710 may compare the detected output current ($I_o$) 714 of DAB converter 114 with reference current 708 and input a result of the comparison into current regulator 712 to compute control variable $\varphi$ 504, as explained in further detail with reference to FIG. 8. In some embodiments, by computing control variable $\varphi$ 504 in real time from voltage regulator 704 and current regulator 712, tight voltage and current regulation may be ensured. Based on the retrieved control variables $\delta_1$ and $\delta_2$ (506, 508) and the computed control variable $\varphi$ 504, PWM generator 510 may generate control signals (S1$p_{CTL}$, S2$p_{CTL}$, S3$p_{CTL}$, S4$p_{CTL}$, S1$s_{CTL}$, S2$s_{CTL}$, S3$s_{CTL}$, and S4$s_{CTL}$) for controlling the switches (S1$p$, S2$p$, S3$p$, S4$p$, S1$s$, S2$s$, S3$s$, and S4$s$) of DAB 114.

Figure 8:
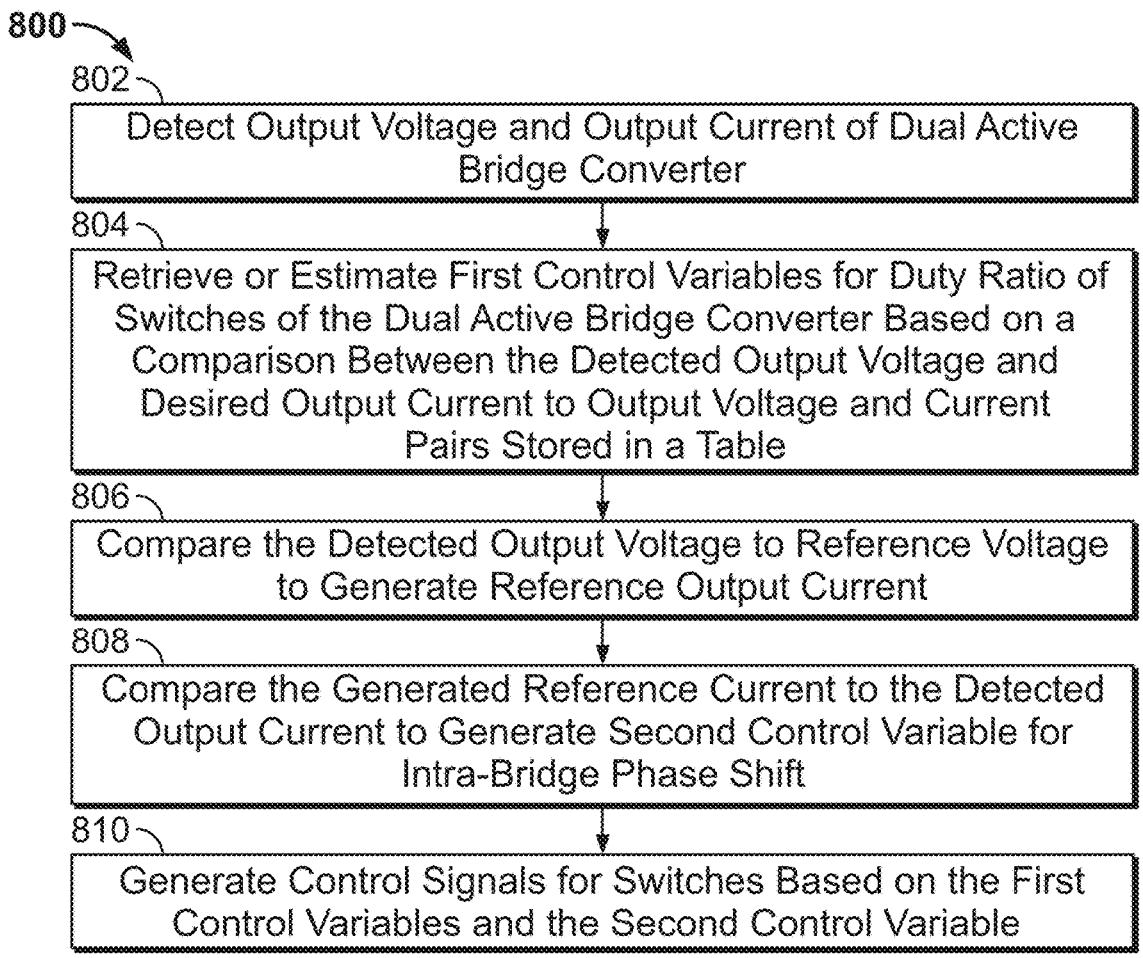
FIG. 8 depicts an illustrative flowchart of the second control process of FIG. 7, in accordance with some embodiments of the present disclosure.

FIG. 8 depicts an illustrative flowchart of the second control process of FIG. 7, in accordance with some embodiments of the present disclosure. At 802, control circuitry 112 detects the output voltage ($V_O$) of DAB converter 114 via second input port 212 ($V_{OUT}$ Probe) and the output current ($I_o$) of DAB converter 114 via an $I_{OUT}$ Probe.

At 804, control circuitry 112 retrieves (or estimates using linear interpolation) first control variables $\delta_1$ and $\delta_2$ for controlling the duty ratio of the switches of DAB 114 based on a comparison between the detected output voltage and the desired output current output voltage and current pairs stored in a table (e.g., GHA lookup table 502). Step 804 corresponds to steps 604-612 of FIG. 6, which are not described again here in detail.

At 806, control circuitry 112 compares the detected output voltage to a reference voltage to generate a reference output current. For example, control circuitry 112 may input a result of the comparison into a voltage regulator to generate the reference output current.

At 808, control circuitry 112 compares the generated reference current to the detected output current to generate a second control variable φ. For example, control circuitry 112 may input a result of the comparison into a current regulator to generate the second control variable.

At 810, control circuitry 112 generates control signals ($S1p_{CTL}$, $S2p_{CTL}$, $S3p_{CTL}$, $S4p_{CTL}$, $S1s_{CTL}$, $S2s_{CTL}$, $S3s_{CTL}$, and $S4s_{CTL}$) for controlling the switches (S1p, S2p, S3p, S4p, S1s, S2s, S3s, and S4s) of DAB 114 based on the retrieved control variables $\delta_1$ and $\delta_2$ and the computed control variable φ.

Figure 9:
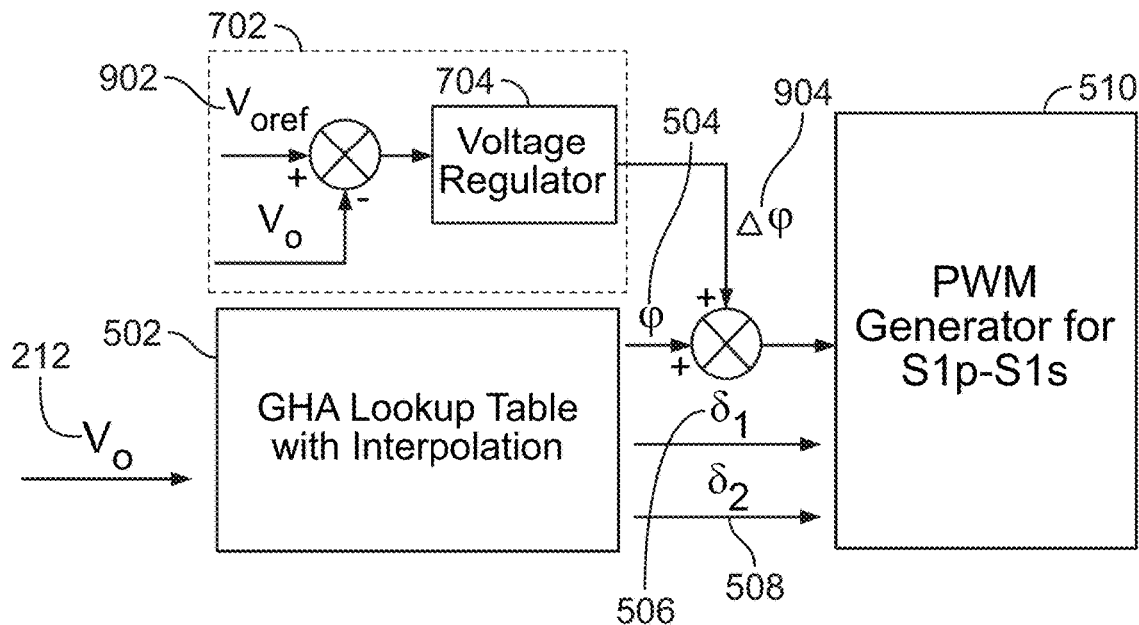
FIG. 9 is an illustrative block diagram of control circuitry for implementing a third control process for a dual active bridge converter, in accordance with some embodiments of the present disclosure.

FIG. 9 is an illustrative block diagram of control circuitry for implementing a third control process for DAB 114, in accordance with some embodiments of the present disclosure. FIG. 9 may correspond to FIG. 5 except that in addition to retrieving control variable φ504 from GHA lookup table 502, control circuitry 112 may also apply a correction factor Δφ 904 to control variable φ504 based on a perturbation from voltage regulator 704 of voltage controller 702 to help stabilize DAB 114. In some embodiments, by applying correction factor Δφ 904 parameter, errors or other non-idealities may be compensated for, such that errors caused by any parameter variations may be minimized. Based on the retrieved control variables $\delta_1$ and $\delta_2$ (506, 508) and the corrected control variable (φ504+Δφ 904), PWM generator 510 may generate control signals ($S1p_{CTL}$, $S2p_{CTL}$, $S3p_{CTL}$, $S4p_{CTL}$, $S1s_{CTL}$, $S2s_{CTL}$, $S3s_{CTL}$, and $S4s_{CTL}$) for controlling the switches (S1p, S2p, S3p, S4p, S1s, S2s, S3s, and S4s) of DAB 114.

Figure 10:
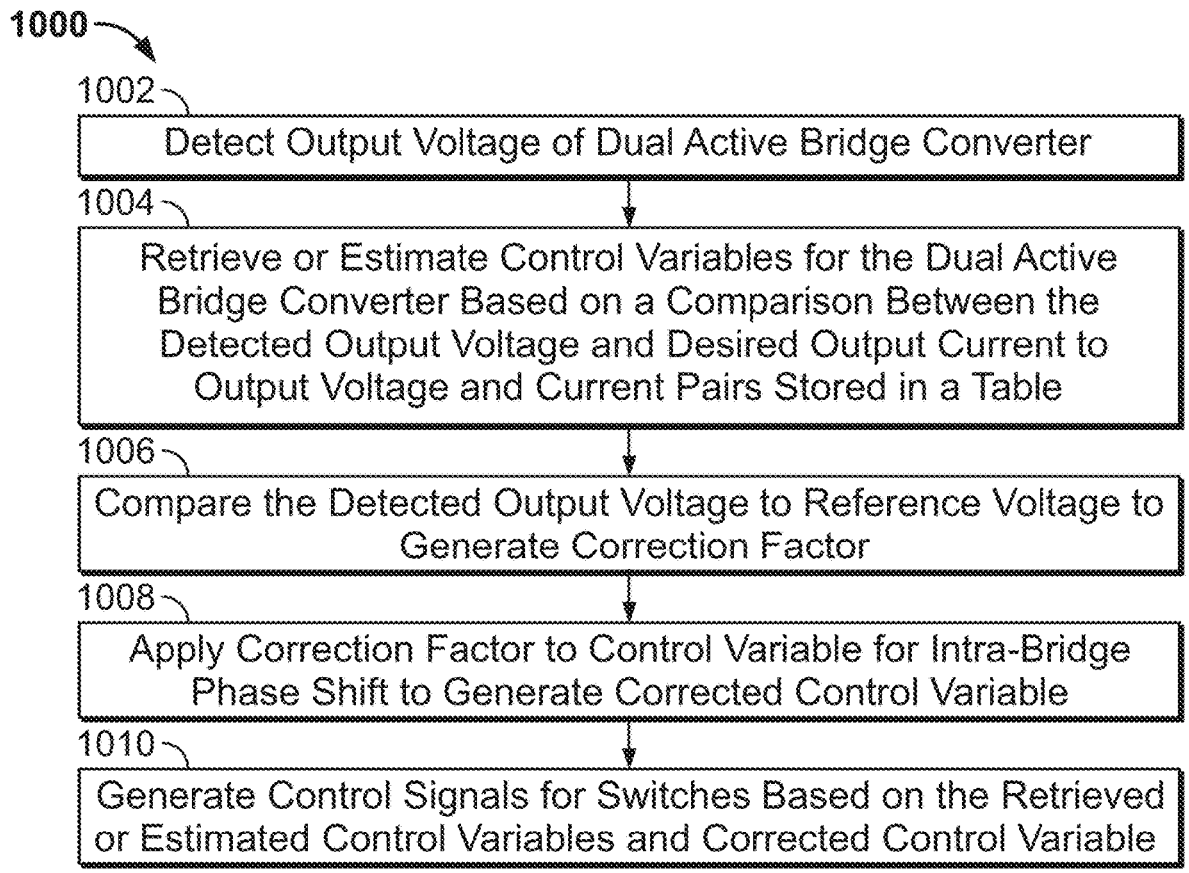
FIG. 10 depicts an illustrative flowchart of the third control process of FIG. 9, in accordance with some embodiments of the present disclosure.

FIG. 10 depicts an illustrative flowchart of the third control process of FIG. 9, in accordance with some embodiments of the present disclosure. At 1002, control circuitry 112 detects the output voltage ($V_O$) of DAB converter 114 via second input port 212 ($V_{OUT}$ Probe).

At 1004, control circuitry 112 retrieves (or estimates using linear interpolation) control variables φ, $\delta_1$, and $\delta_2$ for controlling DAB 114. Step 1004 corresponds to steps 604-612 of FIG. 6, which are not described again here in detail.

At 1006, control circuitry 112 compares the detected output voltage to a reference voltage to generate a correction factor Δφ for adjusting the control variable for the phase shift between the bridge voltages. For example, control circuitry 112 may input a result of the comparison into a voltage regulator to generate the correction factor.

At 1008, control circuitry 112 may apply the generated correction factor to the control variable phase shift to generate a corrected control variable.

At 1010, control circuitry 112 generates control signals ($S1p_{CTL}$, $S2p_{CTL}$, $S3p_{CTL}$, $S4p_{CTL}$, $S1s_{CTL}$, $S2s_{CTL}$, $S3s_{CTL}$, and $S4s_{CTL}$) for controlling the switches (S1p, S2p, S3p, S4p, S1s, S2s, S3s, and S4s) of DAB 114 based on the retrieved control variables $\delta_1$ and $\delta_2$ and the corrected control variable (φ+Δφ).

The processes discussed above are intended to be illustrative and not limiting. One skilled in the art would appreciate that the steps of the processes discussed herein may be omitted, modified, combined and/or rearranged, and any additional steps may be performed without departing from the scope of the invention. For example, in some implementations, the switching frequency ($f_s$) of the DC-DC converter (e.g., DAB 114) may be used as a control variable (e.g., optimized and stored in a GHA lookup table).

The foregoing is merely illustrative of the principles of this disclosure, and various modifications may be made by those skilled in the art without departing from the scope of this disclosure. The above-described embodiments are presented for purposes of illustration and not of limitation. The present disclosure also can take many forms other than those explicitly described herein. Accordingly, it is emphasized that this disclosure is not limited to the explicitly disclosed methods, systems, and apparatuses, but is intended to include variations thereto and modifications thereof, which are within the spirit of the following claims.

What is claimed is:

1. A method for controlling a dual active bridge converter, comprising:
    detecting an output voltage of the dual active bridge converter;
    retrieving, from a predetermined lookup table stored in memory prior to detecting the output voltage, a first target duty ratio of a primary bridge of the dual active bridge converter and a second target duty ratio of a secondary bridge of the dual active bridge converter associated with the output voltage;
    determining a target phase shift between the primary bridge and the secondary bridge, based on the output voltage; and
    causing a plurality of switch control signals, which are provided to respective switches of the primary bridge and the secondary bridge, to switch according to a time-based switching sequence based on the first target duty ratio, the second target duty ratio, and the target phase shift.

2. The method of claim 1, wherein each of the first target duty ratio, the second target duty ratio, and the target phase shift is associated with a desired output current of the dual active bridge converter in the predetermined lookup table.

3. The method of claim 2, wherein the desired output current is selected from among a maximum output current of the dual active bridge converter and a maximum output power of the dual active bridge converter, based on the output voltage.

4. The method of claim 1, wherein the determining the target phase shift comprises retrieving, from the predetermined lookup table, the target phase shift based on the output voltage.

5. The method of claim 1, wherein the determining the target phase shift further comprises retrieving a phase shift from the predetermined lookup table and adjusting the retrieved phase shift based on a comparison between the output voltage and a reference voltage.

6. The method of claim 1, wherein the predetermined lookup table comprises a plurality of reference voltages and a plurality of reference currents, and wherein the determining the target phase shift comprises calculating the target phase shift based on a first comparison between the output voltage and a reference voltage of the plurality of reference voltages and a second comparison between an output current of the dual active bridge converter and a reference current of the plurality of reference currents.

7. The method of claim 1, further comprising determining, in advance of providing the plurality of switch control signals to the respective switches of the primary bridge and the secondary bridge, values in the predetermined lookup table by using a generalized-harmonic approximation (GHA) model to optimize a plurality of control variables.

8. The method of claim 7, wherein the determining the values in the predetermined lookup table comprises determining, for each voltage at predetermined intervals within a voltage operating range of the dual active bridge converter, the plurality of control variables for at least one output current of the dual active bridge converter by minimizing an expression representing a primary winding current of the dual active bridge converter, the plurality of control variables comprising the first target duty ratio, the second target duty ratio, and the target phase shift.

9. The method of claim 8, wherein the minimizing the primary winding current comprises minimizing:

$$I_{RMS} = \sqrt{\sum_{k=1}^{2i+1} \frac{\langle V_{pri}\rangle_k^2 + \langle V_{sec}\rangle_k^2 - 2\langle V_{pri}\rangle_k \langle V_{sec}\rangle_k \cos(k\varphi)}{2k^2 \pi f_s L}},$$

where:
$I_{RMS}$ is the primary winding current, $$\langle V_{pri}\rangle_k = \frac{4V_{in}}{k\pi}\cos(k\delta_1)$$

$$\langle V_{sec}\rangle_k = \frac{4V_{out}}{k\pi}\cos(k\delta_2)$$

φ is the phase shift,
$\delta_1$ is the first target duty ratio,
$\delta_2$ is the second target duty ratio,
$V_{in}$ is an input voltage of the primary bridge,
$V_{out}$ is the output voltage,
L is an inductance of an inductor of the dual active bridge converter, and
$f_s$ is a switching frequency of the respective switches of the primary bridge and the secondary bridge.

10. The method of claim 1, wherein determining the output voltage comprises detecting a signal level at an output port of the dual active bridge converter that is coupled to a rechargeable battery.

11. A system for controlling a dual active bridge converter, comprising:
a memory storing instructions and a predetermined lookup table;
an input port coupled to an output port of the dual active bridge converter;
a plurality of output ports coupled to switches of the dual active bridge converter; and
control circuitry coupled to the memory, the input port, and the plurality of output ports and configured to execute the stored instructions to:
determine an output voltage of the dual active bridge converter via the input port, wherein the storing the predetermined lookup table occurs prior to detecting the output voltage;
retrieve, from the predetermined lookup table, a first target duty ratio of a primary bridge of the dual active bridge converter and a second target duty ratio of a secondary bridge of the dual active bridge converter associated with the output voltage;
determine a target phase shift between the primary bridge and the secondary bridge, based on the output voltage; and
cause a plurality of switch control signals, which are provided to respective switches of the primary bridge and the secondary bridge via the plurality of output ports, to switch according to a time-based switching sequence based on the first target duty ratio, the second target duty ratio, and the target phase shift.

12. The system of claim 11, wherein each of the first target duty ratio, the second target duty ratio, and the target phase shift is associated with a desired output current of the dual active bridge converter in the predetermined lookup table.

13. The system of claim 12, wherein the control circuitry is further configured to select the desired output current from among a maximum output current of the dual active bridge converter and a maximum output power of the dual active bridge converter, based on the output voltage.

14. The system of claim 11, wherein the control circuitry is further configured, when determining the target phase shift, to retrieve, from the predetermined lookup table, the target phase shift based on the output voltage.

15. The system of claim 11, wherein the control circuitry is further configured to, when determining the target phase shift, retrieve a phase shift stored in the predetermined lookup table and adjust the retrieved phase shift based on a comparison between the output voltage and a reference voltage.

16. The system of claim 11, wherein the predetermined lookup table comprises a plurality of reference voltages and a plurality of reference currents, and wherein the control circuitry is further configured, when determining the target phase shift, to calculate the target phase shift based on a first comparison between the output voltage and a reference voltage of the plurality of reference voltages and a second comparison between an output current of the dual active bridge converter and a reference current of the plurality of reference currents.

17. The system of claim 11, wherein the control circuitry is further configured to:
determine, in advance of providing the plurality of switch control signals to the respective switches of the primary bridge and the secondary bridge, values in the predetermined lookup table by using a generalized-harmonic approximation (GHA) model to optimize a plurality of control variables; and
when determining the values in the predetermined lookup table, to determine for each voltage at predetermined intervals within a voltage operating range of the dual active bridge converter, the plurality of control variables for at least one output current of the dual active bridge converter by minimizing an expression representing a primary winding current of the dual active bridge converter, the plurality of control variables comprising the first target duty ratio, the second target duty ratio, and the target phase shift.

18. The system of claim 17, wherein the control circuitry is further configured, when minimizing the expression representing the primary winding current, to minimize:

$$I_{RMS} = \sqrt{\sum_{k=1}^{2i+1} \frac{\langle V_{pri}\rangle_k^2 + \langle V_{sec}\rangle_k^2 - 2\langle V_{pri}\rangle_k \langle V_{sec}\rangle_k \cos(k\varphi)}{2k^2 \pi f_s L}},$$

where:
$I_{RMS}$ is the primary winding current, $$\langle V_{pri}\rangle_k = \frac{4V_{in}}{k\pi}\cos(k\delta_1)$$

-continued $$\langle V_{sec} \rangle_k = \frac{4V_{out}}{k\pi}\cos(k\delta_2)$$

φ is the phase shift,
$\delta_1$ is the first target duty ratio,
$\delta_2$ is the second target duty ratio,
$V_{in}$ is an input voltage of the primary bridge,
$V_{out}$ is the output voltage,
L is an inductance of an inductor of the dual active bridge converter, and
$f_s$ is a switching frequency of the respective switches of the primary bridge and the secondary bridge.

19. The system of claim 11, wherein:
the control circuitry is further coupled to a second output port; and
the control circuitry is further configured, when determining the output voltage, to detect a signal level at the second output port of the dual active bridge converter that is coupled to a rechargeable battery.

20. A method for generating and using a table of predetermined control variables for controlling a dual active bridge converter, having a primary bridge and a secondary bridge, across an output voltage range, the method comprising:

storing, in non-transitory memory, a plurality of pairs of output voltages and target currents arranged in a lookup table;

for each respective output voltage and target current pair in the lookup table, determining values in the table by using a generalized-harmonic approximation (GHA) model to optimize a respective plurality of control variables by minimizing an expression representing a primary winding current of the dual active bridge converter;

storing, in the non-transitory memory, the respective optimized plurality of control variables associated with the respective output voltage and target current pair in the lookup table, wherein the respective optimized plurality of control variables comprises a first target duty ratio of the primary bridge, a second target duty ratio of the second bridge, and a target phase shift between the primary bridge and the secondary bridge;

in response to receiving a detected output voltage and a desired current value from control circuitry, retrieving from the non-transitory memory a target optimized plurality of control variables associated with the detected output voltage and with the desired current value in the lookup table;

transmitting the target optimized plurality of control variables to the control circuitry; and causing a plurality of switch control signals, which are provided to and control respective switches of the primary bridge and the secondary bridge, to switch according to a time-based switching sequence based on the target optimized plurality of control variables.

* * * * *